(12) United States Patent
Tsutsumi et al.

(10) Patent No.: US 12,347,625 B2
(45) Date of Patent: Jul. 1, 2025

(54) MULTILAYER CERAMIC CAPACITOR

(71) Applicant: Murata Manufacturing Co., Ltd., Nagaokakyo (JP)

(72) Inventors: Hironori Tsutsumi, Nagaokakyo (JP); Shoji Fukui, Nagaokakyo (JP); Junichi Kawasaki, Nagaokakyo (JP); Mitsuru Ikeda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 214 days.

(21) Appl. No.: 18/218,714

(22) Filed: Jul. 6, 2023

(65) Prior Publication Data

US 2024/0013980 A1  Jan. 11, 2024

(30) Foreign Application Priority Data

Jul. 7, 2022 (JP) ................. 2022-109804

(51) Int. Cl.
*H01G 4/30* (2006.01)
*H01G 4/008* (2006.01)
*H01G 4/012* (2006.01)
*H01G 4/12* (2006.01)

(52) U.S. Cl.
CPC .............. *H01G 4/30* (2013.01); *H01G 4/008* (2013.01); *H01G 4/012* (2013.01); *H01G 4/1227* (2013.01)

(58) Field of Classification Search
CPC ......... H01G 4/0085; H01G 4/012; H01G 4/30
See application file for complete search history.

(56) References Cited

U.S. PATENT DOCUMENTS

| | | | |
|---|---|---|---|
| 2012/0327557 A1* | 12/2012 | Ahn .................. | H01G 4/228 361/321.3 |
| 2013/0135787 A1* | 5/2013 | Lim .................. | H01G 4/0085 29/25.42 |
| 2014/0301014 A1* | 10/2014 | Kim .................. | H01G 4/30 156/89.12 |
| 2019/0348222 A1 | 11/2019 | Kato | |
| 2021/0366658 A1* | 11/2021 | Yamato .............. | H01G 4/1227 |
| 2025/0014818 A1* | 1/2025 | Tsutsumi ............ | H01G 4/0085 |
| 2025/0014820 A1* | 1/2025 | Tsutsumi ............ | H01G 4/012 |
| 2025/0014821 A1* | 1/2025 | Tsutsumi ............ | H01G 4/1227 |
| 2025/0014828 A1* | 1/2025 | Tsutsumi ............ | H01G 4/30 |

(Continued)

FOREIGN PATENT DOCUMENTS

JP  2019-197790 A  11/2019

*Primary Examiner* — Nathan Milakovich
(74) *Attorney, Agent, or Firm* — Keating & Bennett, LLP

(57) ABSTRACT

A multilayer ceramic capacitor includes a multilayer body including an inner layer portion including dielectric layers and internal electrode layers, and external electrodes on end surfaces of the multilayer body. The internal electrode layers each include a counter electrode portion and an extension electrode portion extending from the counter electrode portion toward the end surface and, when viewing the multilayer body in a cross section parallel to the width direction and the lamination direction, and when a maximum length in the width direction of a range in which one end in the width direction of the counter electrode portions is provided is defined as R1, and a maximum length in the width direction of a range in which one end in the width direction of the extension electrode portions is provided is defined as R2, a relationship between R1 and R2 is R2>R1.

20 Claims, 12 Drawing Sheets

(56) References Cited

U.S. PATENT DOCUMENTS

| | | | |
|---|---|---|---|
| 2025/0014829 A1* | 1/2025 | Tsutsumi | H01G 4/012 |
| 2025/0014830 A1* | 1/2025 | Tsutsumi | H01G 4/1209 |
| 2025/0014831 A1* | 1/2025 | Tsutsumi | H01G 4/224 |

* cited by examiner

MULTILAYER CERAMIC CAPACITOR

CROSS REFERENCE TO RELATED APPLICATIONS

This application is based on and claims the benefit of priority from Japanese Patent Application No. 2022-109804, filed on Jul. 7, 2022, the content of which is incorporated herein by reference.

BACKGROUND OF THE INVENTION

1. Field of the Invention

The present invention relates to a multilayer ceramic capacitor.

2. Description of the Related Art

Multilayer ceramic capacitors have been known which each include a multilayer body including a plurality of dielectric layers made of a ceramic material and a plurality of internal electrode layers laminated therein, and external electrodes on end surfaces of the multilayer body. Furthermore, multilayer ceramic capacitors have been known which each include side margin portions of dielectrics made of a ceramic material, and the side margin portions sandwich a plurality of dielectric layers and a plurality of internal electrode layers on lateral surfaces of a multilayer body (see Japanese Unexamined Patent Application Publication No. 2019-197790, for example).

In such a multilayer ceramic capacitor, it is conceivable to reduce the thickness of each of the side margin portions and increase the area of the internal electrode layers in order to reduce the size and increase the capacitance. However, if the thickness of each of the side margin portions is reduced, the resistance to moisture, i.e., moisture resistance, which penetrates between the lateral surface of the multilayer body and the external electrode to reach the internal electrode layers at the end surface of the multilayer body is reduced, a result of which is that the reliability is degraded.

Furthermore, in the production of multilayer ceramic capacitors, a non-fired or green multilayer body is produced by laminating a plurality of ceramic green sheets on which patterns of internal electrode layers are printed, and providing non-fired side margin portions on the lateral surfaces of the multilayer body chip obtained by cutting the ceramic green sheets. However, when the patterns of internal electrode layers are printed, the edge portion of the patterns tends to be thick, and thus, when these portions are laminated and stacked, structural defects in the multilayer ceramic capacitor may occur.

Therefore, there is demand for the development of multilayer ceramic capacitors, each having high moisture resistance reliability while achieving a reduction in size and large capacitance.

SUMMARY OF THE INVENTION

Preferred embodiments of the present invention provide multilayer ceramic capacitors each with high moisture resistance reliability while achieving a reduction in size and a large capacitance.

The inventors of preferred embodiments of the present invention discovered that it is possible to maintain high moisture resistance reliability while providing a small size and a large capacitance, such that, in a multilayer ceramic capacitor including a multilayer body in which side margin portions are provided on both sides of an inner layer portion in which a plurality of dielectric layers and a plurality of internal electrode layers are laminated, the internal electrode layers each include a counter electrode portion generating capacitance and an extension electrode portion extending from the counter electrode portion toward an external electrode, and the counter electrode portion and the extension electrode portion are laminated in a lamination direction while being randomly shifted in a width direction in a predetermined range.

A preferred embodiment of the present invention provides a multilayer ceramic capacitor including a multilayer body including an inner layer portion including a plurality of dielectric layers and a plurality of internal electrode layers laminated therein, a pair of main surfaces opposed to each other in a lamination direction, a pair of end surfaces opposed to each other in a length direction orthogonal or substantially orthogonal to the lamination direction, and a pair of lateral surfaces opposed to each other in a width direction orthogonal or substantially orthogonal to the lamination direction and the length direction, the pair of lateral surfaces being provided by side margin portions on both sides of the inner layer portion, and a pair of external electrodes on the end surfaces of the multilayer body, the pair of external electrodes being opposed to each other, wherein the plurality of internal electrode layers each include, in the length direction, a counter electrode portion opposed to adjacent counter electrode portions of the internal electrode layers in the lamination direction, and an extension electrode portion extending from the counter electrode portion toward the end surface, and, when viewing the multilayer body in a cross section parallel or substantially parallel to the width direction and the lamination direction, and when a maximum length in the width direction of a range in which one end in the width direction of the counter electrode portions is provided is defined as R1, and a maximum length in the width direction of a range in which one end in the width direction of the extension electrode portions is provided is defined as R2, a relationship between R1 and R2 is R2>R1.

According to preferred embodiments of the present invention, it is possible to provide multilayer ceramic capacitors each with high moisture resistance reliability while achieving a reduction in size and a large capacitance.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, multilayer ceramic capacitors according to preferred embodiments of the present invention will be described. However, the present invention is not limited to the following structures, and can be appropriately modified and applied without departing from the gist and scope of the present invention.

Multilayer Ceramic Capacitor

Figure 1:
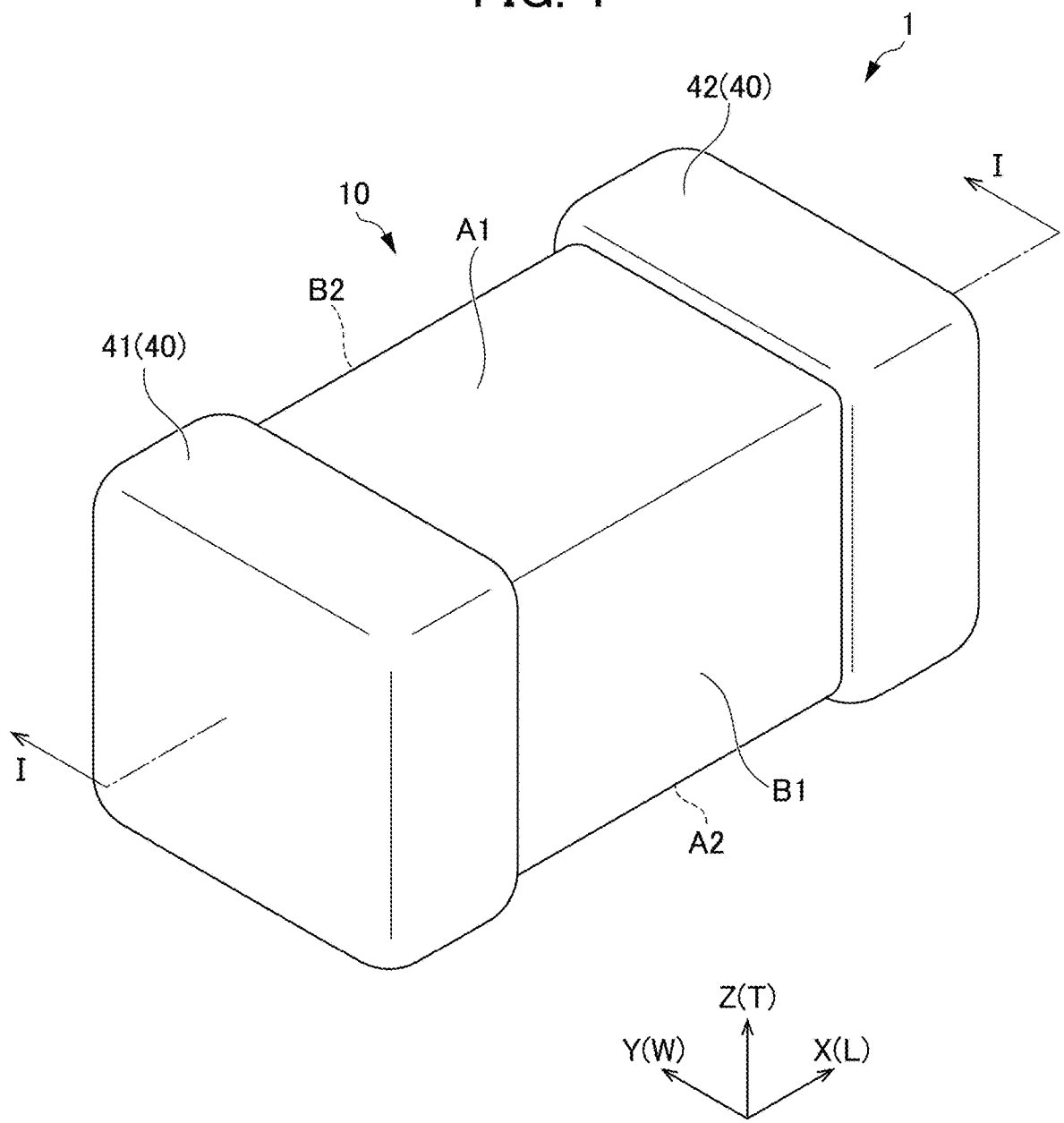
FIG. 1 is an external view of a multilayer ceramic capacitor according to a preferred embodiment of the present invention.
Figure 2:
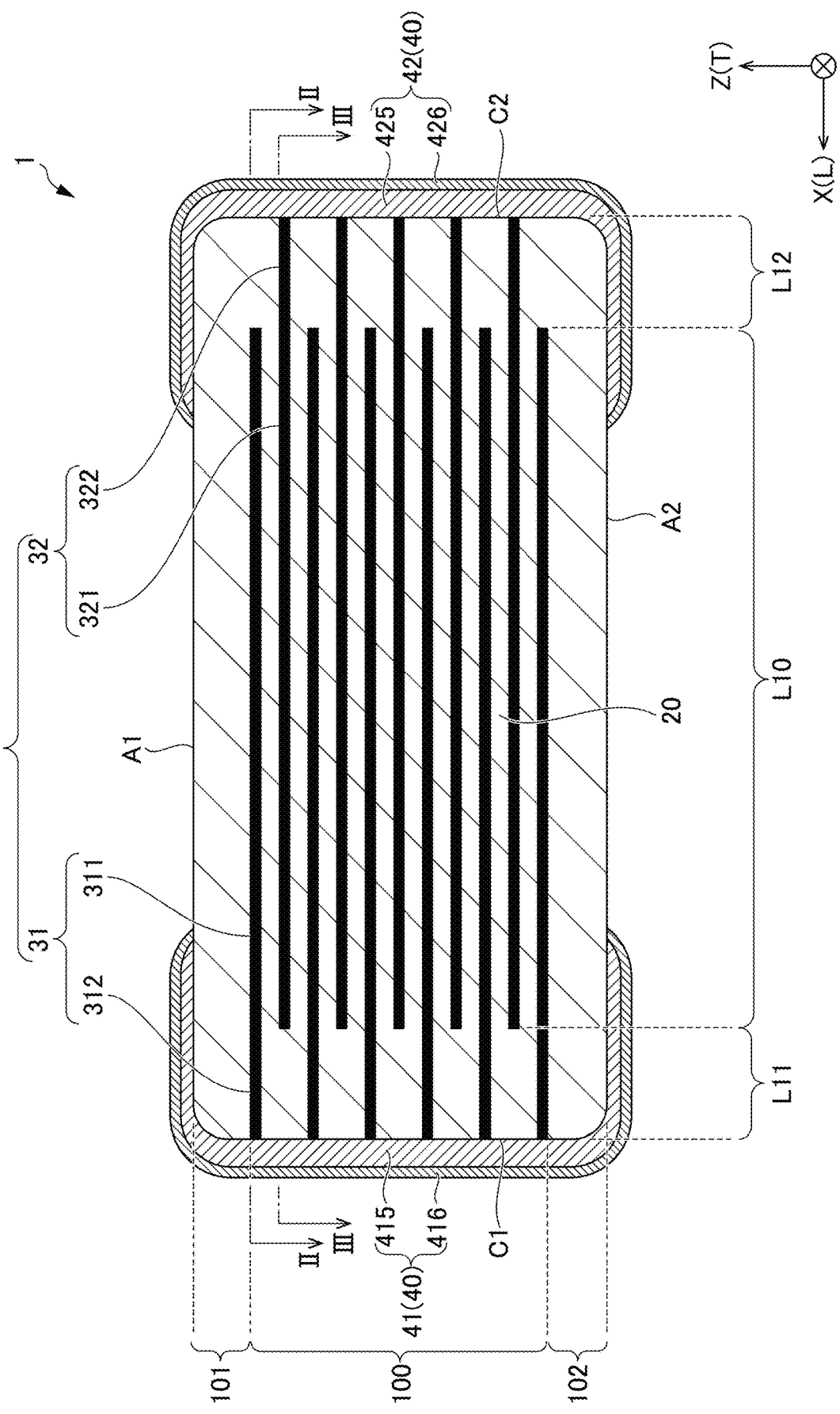
FIG. 2 is a cross-sectional view (LT cross-section) taken along the line I-I of the multilayer ceramic capacitor shown in FIG. 1.
Figure 3:
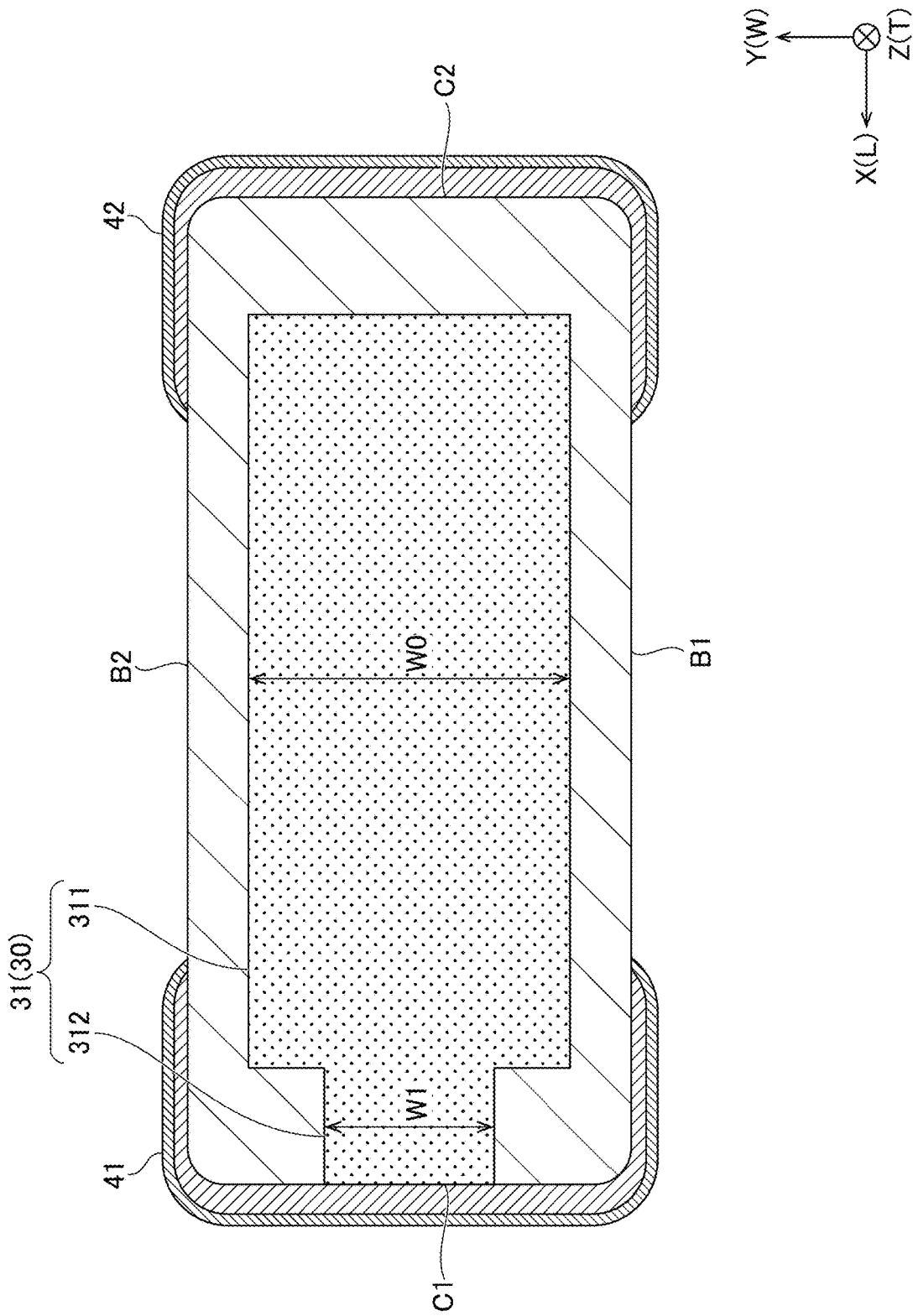
FIG. 3 is a cross-sectional view (LW cross-section) taken along the line II-II of the multilayer ceramic capacitor shown in FIG. 2.
Figure 4:
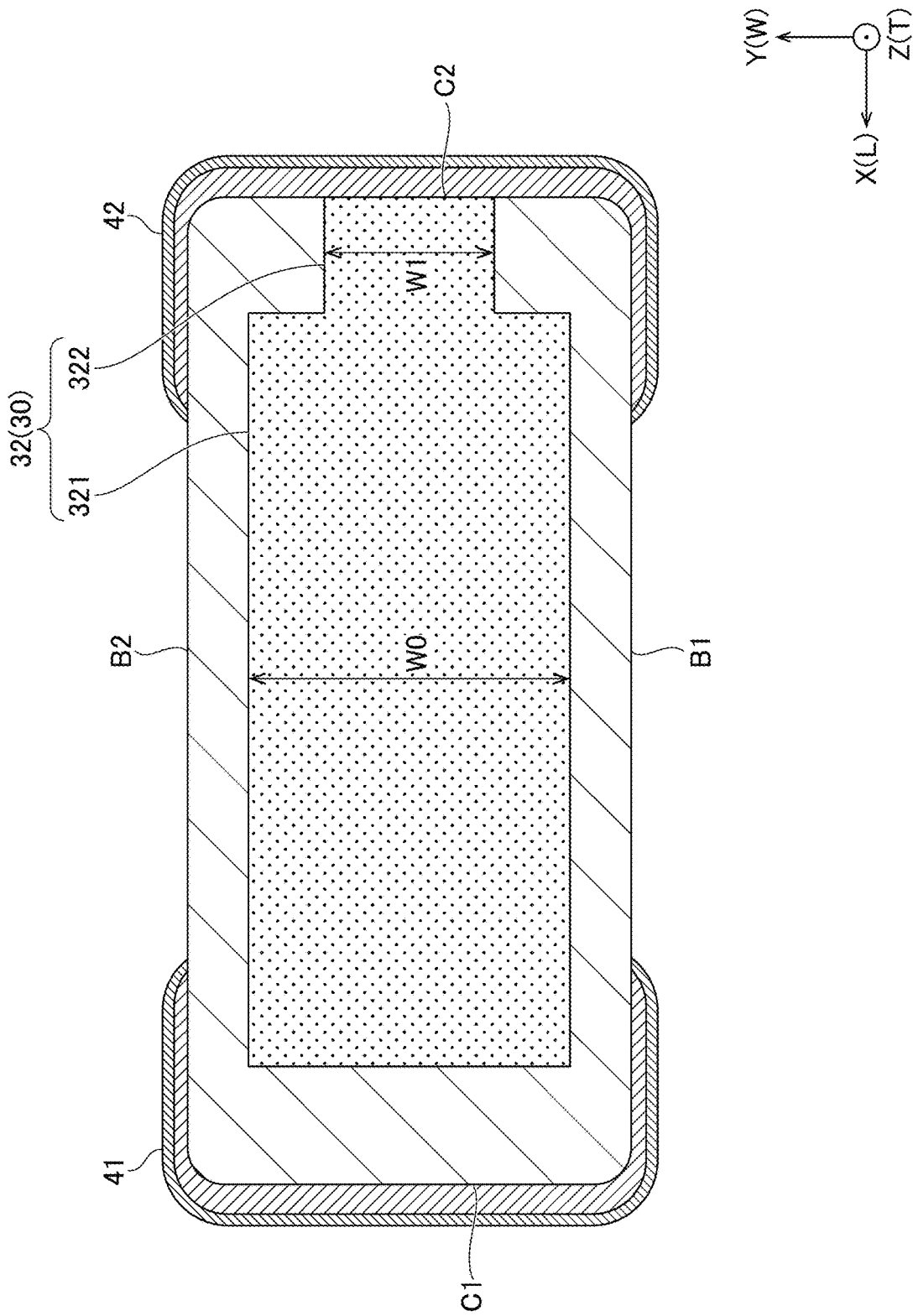
FIG. 4 is a cross-sectional view (LW section) taken along the line III-III of the multilayer ceramic capacitor shown in FIG. 2.

FIG. 1 is an external view of an example of a multilayer ceramic capacitor according to a preferred embodiment of the present invention. FIG. 2 is a cross-sectional view schematically showing the structure of the multilayer ceramic capacitor shown in FIG. 1. FIGS. 3 and 4 are each a cross-sectional view showing the shape of the internal electrode layer of the multilayer ceramic capacitor shown in FIG. 1.

In the present specification, the lamination or stacking direction, the width direction, and the length direction of the multilayer ceramic capacitor and the multilayer body are directions defined by arrows T, W, and L, respectively, shown in FIG. 1 and the cross-sectional view shown in FIG. 2. In the present preferred embodiment, the lamination direction T, the width direction W, and the length direction L are orthogonal or substantially orthogonal to each other such that the XYZ orthogonal coordinate system is shown. However, they are not necessarily orthogonal or substantially orthogonal to each other, and they may intersect each other. The lamination direction T is a direction in which a plurality of dielectric layers 20 and a plurality of pairs of the first internal electrode layer 31 and the second internal electrode layer 32 are laminated. The cross section shown in FIG. 2 shows a cross section parallel or substantially parallel to the length direction L and the lamination direction T, and is also referred to as an LT cross section.

The multilayer ceramic capacitor 1 includes a multilayer body 10 and external electrodes 40. The external electrodes 40 include a first external electrode 41 and a second external electrode 42.

The multilayer body 10 has a rectangular or substantially rectangular parallelepiped shape, and includes a first main surface A1 and a second main surface A2 opposed to each other in the lamination direction T, a first lateral surface B1 and a second lateral surface B2 opposed to each other in the width direction W, and a first end surface C1 and a second end surface C2 opposed to each other in the length direction L.

The corner portions and ridge portions of the multilayer body 10 are preferably rounded. The corner portions are each a portion where the three surfaces of the multilayer body 10 intersect, and the ridge portions are each a portion where the two surfaces of the multilayer body 10 intersect.

As shown in FIG. 2, the multilayer body 10 includes a plurality of dielectric layers 20 and a plurality of internal electrode layers 30 laminated in the lamination direction T. The multilayer body 10 includes an inner layer portion 100 and a first outer layer portion 101 and a second outer layer portion 102 that sandwich the inner layer portion 100 in the lamination direction T.

The inner layer portion 100 includes some of the plurality of dielectric layers 20 and a plurality of internal electrode layers 30. In the inner layer portion 100, the plurality of internal electrode layers 30 are opposed to each other with the dielectric layer 20 interposed therebetween. The inner layer portion 100 generates capacitance and substantially defines and functions as a capacitor.

The first outer layer portion 101 is adjacent to the first main surface A1 of the multilayer body 10, and the second outer layer portion 102 is adjacent to the second main surface A2 of the multilayer body 10. More specifically, the first outer layer portion 101 is provided between the internal electrode layer closest to the first main surface A1 of the plurality of internal electrode layers 30 and the first main surface A1, and the second outer layer portion 102 is provided between the internal electrode layer 30 closest to the second main surface A2 of the plurality of internal electrode layers 30 and the second main surface A2. The first outer layer portion 101 and the second outer layer portion 102 do not include the internal electrode layer 30, but each include a portion of the plurality of dielectric layers other than some of the plurality of dielectric layers 20 for the inner layer portion 100. The first outer layer portion 101 and the second outer layer portion 102 define and function as a protective layer of the inner layer portion 100.

Figure 6:
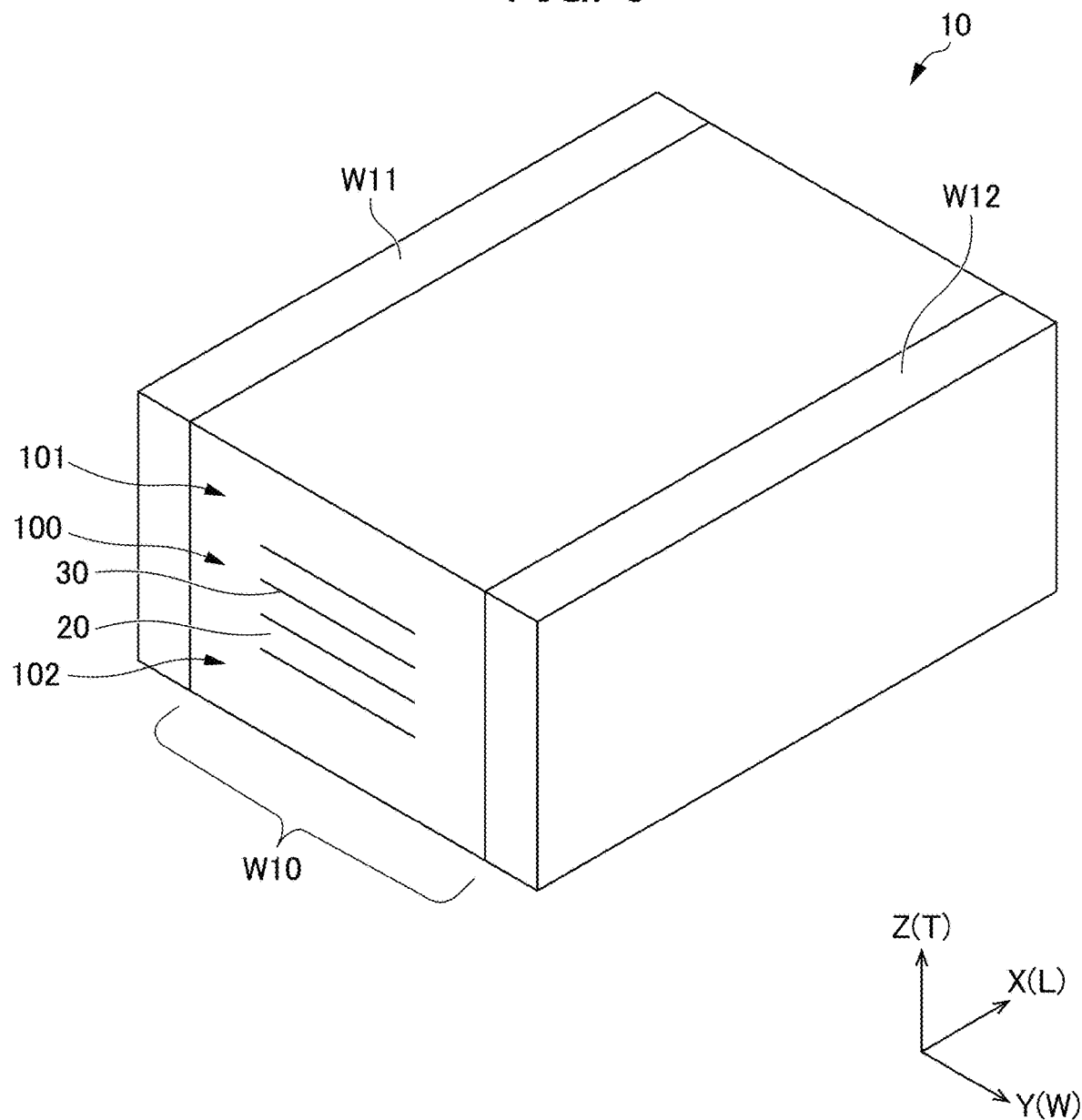
FIG. 6 is a schematic view of a structure of a multilayer body according to a preferred embodiment of the present invention.

As shown in FIG. 6, the multilayer body 10 includes a first lateral surface-side outer layer portion W11 (hereinafter, also referred to as a first side margin portion) and a second lateral surface-side outer layer portion W12 (hereinafter, also referred to as a second side margin portion) that sandwich the inner layer portion 100, the first outer layer portion 101, and the second outer layer portion 102 in the width direction W, i.e., the plurality of dielectric layers 20 and the plurality of internal electrode layers 30. A portion sandwiched between the first side margin portion W11 and the second side margin portion W12 and including the plurality of dielectric layers 20 and the plurality of internal electrode layers 30 is also referred to as an electrode counter portion W10.

The first side margin portion W11 is adjacent to the first lateral surface B1 of the multilayer body 10, and the second side margin portion W12 is adjacent to the second lateral surface B2 of the multilayer body 10. More specifically, the first side margin portion W11 is provided between the end of the internal electrode layer 30 adjacent to the first lateral surface B1 and the first lateral surface B1, and the second side margin portion W12 is provided between the end of the internal electrode layer 30 adjacent to the second lateral surface B2 and the second lateral surface B2. The first side margin portion W11 and the second side margin portion W12 are each made of a dielectric material. The first side margin portion W11 and the second side margin portion W12 each define and function as a protective layer of the internal electrode layer 30. The first side margin portion W11 and the second side margin portion W12 are also each referred to as a side gap or a W gap.

As a material of the dielectric layer 20, for example, a dielectric ceramic including $BaTiO_3$, $CaTiO_3$, $SrTiO_3$, $CaZrO_3$, or the like can be used as a main component. As a material of the dielectric layer 20, at least one of, for example, Mg, Si, Mn, a rare earth element, Al, Ni, V, and the like may be added as a subcomponent. Thus, the dielectric layer 20 includes, for example, Ba and Ti as main components, and at least one of Mg, Si, Mn, a rare earth element, Al, Ni, V, and the like as a subcomponent. Examples of the rare earth elements include La, Ce, Pr, Nd, Sm, Eu, Gd, Tb, Dy, Ho, Er, Tm, Yb, Lu and Y, and among them, Dy is preferable. The dielectric layer 20 includes a plurality of dielectric grains.

The thickness of the dielectric layer 20 is not particularly limited, but is preferably, for example, about 0.2 μm or more and about 0.6 μm or less, and more preferably about 0.3 μm or more and about 0.45 μm or less. The number of dielectric layers is not particularly limited, but is preferably, for example, 100 or more and 2000 or less. The number of the dielectric layers refers to a total number of the number of the dielectric layers of the inner layer portion and the number of the dielectric layers of the outer layer portions.

Similarly, dielectric ceramic including, for example, $BaTiO_3$, $CaTiO_3$, $SrTiO_3$, $CaZrO_3$, or the like as a main component can be used as a material of the dielectric for the first side margin portion W11 and the second side margin portion W12. Furthermore, as a material of the dielectric for the first side margin portion W11 and the second side margin portion W12, at least one of, for example, Mg, Si, Mn, a rare earth element, Al, Ni, V, and the like may be added as a subcomponent. Thus, the dielectric for the first side margin portion W11 and the second side margin portion W12 include, for example, Ba and Ti as main components, and at least one selected from Mg, Si, Mn, a rare earth element, Al, Ni, V, and the like as a subcomponent. Examples of the rare earth element include La, Ce, Pr, Nd, Sm, Eu, Gd, Tb, Dy, Ho, Er, Tm, Yb, Lu and Y, and among them, Dy is preferable. The dielectric layer 20 includes a plurality of dielectric grains.

The thicknesses of the first side margin portion W11 and the second side margin portion W12 are not particularly limited, but are preferably, for example, about 13 μm or more and about 25 μm or less, and more preferably about 13 μm or more and about 18 μm or less. The dielectric in each of the first side margin portion W11 and the second side margin portion W12 is not particularly limited, but may include a single-layer structure or a multi-layer structure of two or more layers.

The plurality of internal electrode layers 30 include the plurality of first internal electrode layers 31 and the plurality of second internal electrode layers 32. The plurality of first internal electrode layers 31 and the plurality of second internal electrode layers 32 are alternately provided in the lamination direction T of the multilayer body 10.

The first internal electrode layers 31 each include a counter electrode portion 311 and an extension electrode portion 312, and the second internal electrode layers 32 each include a counter electrode portion 321 and an extension electrode portion 322.

The counter electrode portion 311 and the counter electrode portion 321 are opposed to each other with the dielectric layer 20 interposed therebetween in the lamination direction T of the multilayer body 10. The shapes of the counter electrode portion 311 and the counter electrode portion 321 are not particularly limited, and may be rectangular or substantially rectangular, for example. The counter electrode portion 311 and the counter electrode portion 321 substantially define and function as capacitors to generate capacitance.

The extension electrode portion 312 extends from the counter electrode portion 311 toward the first end surface C1 of the multilayer body 10, and is exposed at the first end surface C1. The extension electrode portion 322 extends from the counter electrode portion 321 toward the second end surface C2 of the multilayer body 10, and is exposed at the second end surface C2. The extension electrode portion 312 and the extension electrode portion 322 will be described in detail later.

With such a configuration, the first internal electrode layer 31 is connected to the first external electrode 41, and a gap is provided between the first internal electrode layer 31 and the second end surface C2 of the multilayer body 10, i.e., the second external electrode 42. Furthermore, the second internal electrode layer 32 is connected to the second external electrode 42, and a gap is provided between the second internal electrode layer 32 and the first end surface C1 of the multilayer body 10, i.e., the first external electrode 41.

The first internal electrode layer 31 and the second internal electrode layer 32 each include, for example, Ni as a main component. Furthermore, the first internal electrode layer 31 and the second internal electrode layer 32 may include, for example, at least one of metals such as Cu, Ag, Pd, and Au or alloys including at least one of these metals such as Ag—Pd alloy as a main component, or may include a component other than the main component. Furthermore, the first internal electrode layer 31 and the second internal electrode layer 32 may include, for example, dielectric particles having the same composition as the ceramic include in the dielectric layer 20 as a component other than the main component. In this specification, the metal of the main component is defined as a metal component having the highest weight %.

The thicknesses of the first internal electrode layer 31 and the second internal electrode layer 32 are not particularly limited, but are preferably, for example, about 0.30 μm or more and about 0.40 μm or less, and more preferably about 0.30 μm or more and about 0.35 μm or less. The number of the first internal electrode layer 31 and the second internal electrode layer 32 is not particularly limited, but is preferably, for example, 10 or more and 1000 or less.

As shown in FIG. 2, the multilayer body 10 includes, in the length direction L, an electrode counter portion L10 in which the first internal electrode layer 31 and the second internal electrode layer 32 of the internal electrode layer 30 are opposed to each other, a first end margin portion L11, and a second end margin portion L12. The first end margin portion L11 is provided between the electrode counter portion L10 and a first end surface C1, and the second end margin portion L12 is provided between the electrode counter portion L10 and a second end surface C2. More specifically, the first end margin portion L11 is provided between the end of the second internal electrode layer 32 adjacent to the first end surface C1 and the first end surface C1, and the second end margin portion L12 is provided between the end of the first internal electrode layer 31 adjacent to the second end surface C2 and the second end surface C2. The first end margin portion L11 does not include the second internal electrode layers 32, and includes the first internal electrode layers 31 and the dielectric layers 20. The second end margin portion L12 does not include the first internal electrode layers 31, and includes the second internal electrode layers 32 and the dielectric layers 20. The first end margin portion L11 functions as an extension electrode portion of the first internal electrode layers 31 toward the first end surface C1, and the second end margin portion L12 functions as an extension electrode portion of the second internal electrode layers 32 toward the second end surface C2. The first end margin portion L11 and the second end margin portion L12 are also each referred to as an end gap or an L gap.

The counter electrode portions 311 of the first internal electrode layers 31 and the counter electrode portions 321 of the second internal electrode layers 32 described above are provided in the electrode counter portion L10. The extension electrode portions 312 of the first internal electrode layers 31 described above are provided in the first end margin portion L11, and the extension electrode portions 322 of the second internal electrode layers 32 described above are provided in the second end margin portion L12.

The dimensions of the multilayer body 10 described above are not particularly limited but, for example, the length in the length direction L is preferably about 0.6 mm or more and about 1.6 mm or less, the width in the width direction W is preferably about mm or more and about 0.8 mm or less, and the thickness in the lamination direction T is preferably about 0.3 mm or more and about mm or less. The dimensions of the multilayer ceramic capacitor 1 including the external electrodes 40, which will be described later, are not particularly limited but, for example, when the thickness of the dielectric layer in the lamination direction T is about 0.2 μm or more and about 0.6 μm or less, the length in the length direction L is preferably about 0.6 mm or more and about 1.0 mm or less, the width in the width direction W is preferably about 0.3 mm or more and about 0.5 mm or less, and the thickness in the lamination direction T is preferably, for example, about 0.3 mm or more and about 0.5 mm or less. Furthermore, for example, when the thickness of the dielectric layer in the lamination direction T is about 1.0 μm or more and about 15 μm or less, the length in the length direction L is preferably about 1.8 mm or more and about 6.0 mm or less, the width in the width direction W is preferably about 0.8 mm or more and about 5.5 mm or less, and the thickness in the lamination direction T is preferably, for example, about 0.8 mm or more and about 5.5 mm or less. The relationship between the thickness of the dielectric layer in the lamination direction T and the dimensions of the multilayer ceramic capacitor 1 is not limited to these relationships, and may be combined. For example, even when the thickness of the dielectric layer in the lamination direction T is about 0.2 μm or more and about 0.6 μm or less, the multilayer ceramic capacitor may have a length in the length direction L of about 1.8 mm or more and about 6.0 mm or less, a width in the width direction W of about 0.8 mm or more and about 5.5 mm or less, and a thickness in the lamination direction T of about 0.8 mm or more and about 5.5 mm or less. In addition, all of these dimensions have tolerances.

Non-limiting examples of methods of measuring the thicknesses of the dielectric layer 20 and the internal electrode layer 30 include a method of observing, with a scanning electron microscope, an LT cross section in the vicinity of the center in the width direction of the multilayer body exposed by polishing. Furthermore, each value may be an average value of measurement values at a plurality of positions in the length direction, or may be an average value of measurement values at a plurality of positions in the lamination direction.

Similarly, non-limiting examples of methods of measuring the thickness of the multilayer body 10 or the thickness of the multilayer ceramic capacitor 1 include a method of observing, with a scanning electron microscope, an LT cross section in the vicinity of the center in the width direction of the multilayer body exposed by polishing or a WT cross section in the vicinity of the center in the length direction of the multilayer body or the multilayer ceramic capacitor exposed by polishing. Furthermore, each value may be an average value of measurement values at a plurality of positions in the length direction or the width direction. Similarly, examples of a method of measuring the length of the multilayer body 10 or the length of the multilayer ceramic capacitor 1 include a method of observing, with a scanning electron microscope, an LT cross section in the vicinity of the center in the width direction of the multilayer body or the multilayer ceramic capacitor exposed by polishing. Furthermore, each value may be an average value of measurement values at a plurality of locations in the lamination direction. Similarly, examples of a method of measuring the width of the multilayer body 10 or the width of the multilayer ceramic capacitor 1 include a method of observing, with a scanning electron microscope, a WT cross section in the vicinity of the center in the length direction of the multilayer body or the multilayer ceramic capacitor exposed by polishing. Furthermore, each value may be an average value of measurement values at a plurality of locations in the lamination direction.

The external electrodes 40 includes the first external electrode 41 and the second external electrode 42.

The first external electrode 41 is provided on the first end surface C1 of the multilayer body 10 and is connected to the first internal electrode layers 31. The first external electrode 41 may extend from the first end surface C1 to a portion of the first main surface A1 and a portion of the second main surface A2. The first external electrode 41 may extend from the first end surface C1 to a portion of the first lateral surface B1 and a portion of the second lateral surface B2.

The second external electrode 42 is provided on the second end surface C2 of the multilayer body 10 and is connected to the second internal electrode layers 32. The second external electrode 42 may extend from the second end surface C2 to a portion of the first main surface A1 and a portion of the second main surface A2. The second external electrode 42 may extend from the second end surface C2 to a portion of the first lateral surface B1 and a portion of the second lateral surface B2.

The first external electrode 41 includes, for example, a first base electrode layer 415 and a first plated layer 416, and the second external electrode 42 includes, for example, a second base electrode layer 425 and a second plated layer 426. The first external electrode 41 may include only the first plated layer 416, and the second external electrode 42 may include only the second plated layer 426.

The first base electrode layer 415 and the second base electrode layer 425 may be, for example, fired layers including metal and glass. Examples of the glass include glass components including at least one selected from B, Si, Ba, Mg, Al, Li, and the like. As a specific example, borosilicate glass can be used. The metal includes, for example, Cu as a main component. The metal may include at least one of, for example, a metal such as Ni, Ag, Pd, or Au or an alloy such as Ag—Pd alloy as a main component, or may include a component other than the main component.

For example, the fired layer is obtained by applying a conductive paste including a metal and glass to a multilayer body by a dipping method and firing the multilayer body. The fired layer may be fired after firing the internal electrode layer, or may be fired simultaneously with the internal electrode layer. The fired layer may include a plurality of layers.

Alternatively, the first base electrode layer 415 and the second base electrode layer 425 may be, for example, resin layers including conductive particles and a thermosetting resin. The resin layer may be provided on the fired layer described above, or may be provided directly on the multilayer body without the fired layer.

The resin layer is obtained by, for example, applying a conductive paste including conductive particles and a thermosetting resin to a multilayer body by a coating method and firing the multilayer body. The resin layer may be fired after firing the internal electrode layer, or may be fired simultaneously with the internal electrode layer. The resin layer may include a plurality of layers.

The thickness per layer of each of the first base electrode layer 415 and the second base electrode layer 425 each defining and functioning as a fired layer or a resin layer is not particularly limited, and may be, or example, about 1 µm or more and about 10 µm or less.

Alternatively, the first base electrode layer 415 and the second base electrode layer 425 may each be formed by, for example, a thin film formation method such as a sputtering method or a vapor deposition method, and each may be a thin film layer having a thickness of, for example, about 1 µm or less in which metal particles are deposited.

The first plated layer 416 covers at least a portion of the first base electrode layer 415, and the second plated layer 426 covers at least a portion of the second base electrode layer 425. Examples of the first plated layer 416 and the second plated layer 426 include at least one of a metal such as Cu, Ni, Ag, Pd, or Au, or an alloy such as an Ag—Pd alloy.

Each of the first plated layer 416 and the second plated layer 426 may include a plurality of layers. A two-layer structure of, for example, Ni plating and Sn plating is preferable. The Ni plated layer can prevent the base electrode layer from being eroded by the solder when the ceramic electronic component is mounted, and the Sn plated layer can improve the wettability of the solder when the ceramic electronic component is mounted and can be easily mounted.

The thickness per layer of each of the first plated layer 416 and the second plated layer 426 is not particularly limited, and may be, for example, about 1 µm or more and about 10 µm or less.

Next, the internal electrode layers 30, that is, the first internal electrode layers 31 and the second internal electrode layers 32, will be further described.

As shown in FIG. 3, in each of the first internal electrode layers 31, the width of the extension electrode portion 312 in the width direction W is smaller than the width of the counter electrode portion 311 in the width direction W. For example, the width W1 in the width direction W of the extension electrode portion 312 in the vicinity of the center in the length direction is smaller than the width W0 in the width direction W of the counter electrode portion 311 in the vicinity of the center in the length direction of the multilayer body 10. As shown in FIG. 4, in each of the second internal electrode layers 32, the width of the extension electrode portion 322 in the width direction W is smaller than the width of the counter electrode portion 321 in the width direction W. For example, the width W1 in the width direction W of the extension electrode portion 322 in the vicinity of the center in the length direction is smaller than the width W0 in the width direction W of the counter electrode portion 321 in the vicinity of the center in the length direction of the multilayer body 10.

Non-limiting examples of methods of measuring the widths W0 and W1 of the internal electrode layer 30 include a method of observing the LW cross section of the internal electrode layer in the vicinity of the center in the lamination direction of the multilayer body exposed by polishing. For example, in a case where the multilayer ceramic capacitor 1 is 0603 size (L=about 0.6 mm, W=about 0.3 mm, T=about 0.3 mm), the length L in the length direction of the extension electrode portions 312 and 322 is about 25 µm, in a case where the multilayer ceramic capacitor 1 is 1005 size (L=about 1.0 mm, W=about 0.5 mm, T=about 0.5 mm), the length L in the length direction of the extension electrode portions 312 and 322 is about 25 µm, and in a case where the multilayer ceramic capacitor 1 is 1608 size (L=about 1.6 mm, W=about 0.8 mm, T=about 0.8 mm), the length of the extension electrode portions 312 and 322 in the length direction L is about 40 µm or more and about 50 µm or less. The size and dimensions of the multilayer ceramic capacitor 1 include the multilayer body 10 and the external electrodes 40.

The shape of the extension electrode portion 312 is not particularly limited but, for example, as shown in FIG. 3, the shape of the extension electrode portion 312 may include a rectangular or substantially rectangular shape which is linear with an equal or substantially equal width from a portion narrower than both corners of the end of the counter electrode portion 311 adjacent to the first end surface C1 toward the first end surface C1. Similarly, as shown in FIG. 4, the shape of the extension electrode portion 322 may include a rectangular or substantially rectangular shape having an equal or substantially equal width and a linear shape from a portion narrower than both corners of the end of the counter electrode portion 321 adjacent to the second end surface C2 toward the second end surface C2.

Furthermore, for example, the shape of the extension electrode portion 312 may include a trapezoid shape linearly narrowing from both corners adjacent to the first end surface C1 of the counter electrode portion 311 toward the first end surface C1, and similarly, the shape of the extension electrode portion 322 may include a trapezoid shape linearly narrowing from both corners adjacent to the second end surface C2 of the counter electrode portion 321 toward the second end surface C2 (not shown).

Furthermore, for example, the shape of the extension electrode portion 312 may include a curved shape that becomes narrower in a curved manner from both corners adjacent to the first end surface C1 of the counter electrode portion 311 toward the first end surface C1. Similarly, the shape of the extension electrode portion 322 may include a curved shape that becomes narrower in a curved manner from both corners adjacent to the second end surface C2 of the counter electrode portion 321 toward the second end surface C2 (not shown).

Next, a non-limiting example of a method of manufacturing the above-described multilayer ceramic capacitor 1 will be described. First, a dielectric sheet for providing the dielectric layer 20 and an electrically conductive paste for the internal electrode layer 30 are prepared. The dielectric sheet and the electrically conductive paste include a binder and a solvent. As the binder and the solvent, well-known materials can be used.

Figure 5:
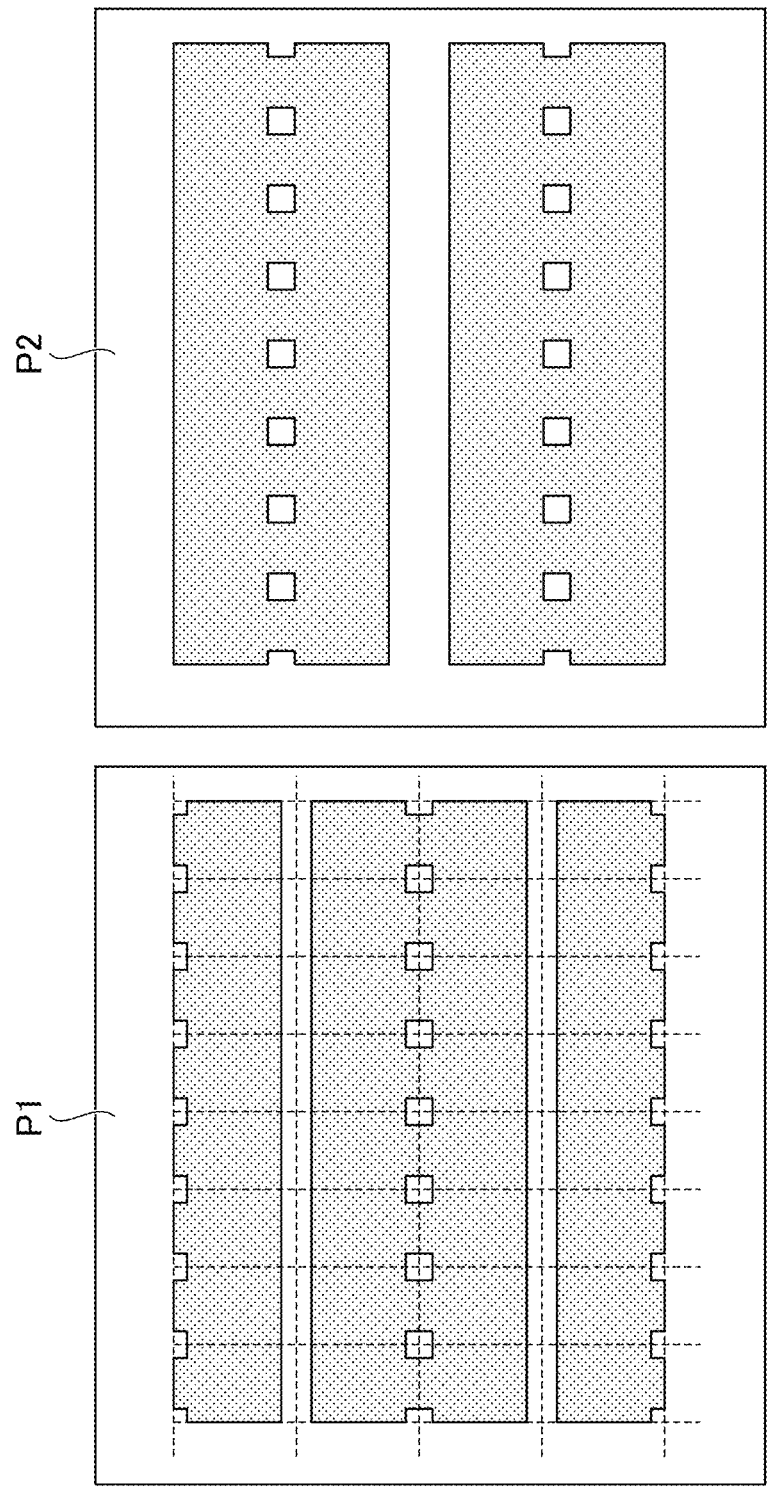
FIG. 5 is a schematic view of a green sheet coated with an internal electrode layer pattern according to a preferred embodiment of the present invention.

Next, the electrically conductive paste is printed on the dielectric sheet in a predetermined pattern, for example, to form an internal electrode layer pattern on the dielectric sheet. As a method of forming the internal electrode layer pattern, for example, screen printing, gravure printing, or the like can be used. FIG. 5 illustrates two patterns for printing internal electrode layers. Although the dielectric sheet printed in the pattern P1 and the dielectric sheet printed in the pattern P2 are shown, the pattern P1 is shown with dotted lines indicating positions to be cut after lamination.

Next, a predetermined number of dielectric sheets for providing the second outer layer portion 102 on which no internal electrode layer pattern is printed are laminated. Then, a dielectric sheet for providing the inner layer portion 100 on which the internal electrode layer pattern is printed is sequentially laminated thereon. Then, a predetermined number of dielectric sheets for providing the first outer layer portion 101 on which no internal electrode layer pattern is printed are laminated thereon. Thus, a multilayer sheet is produced.

Next, the multilayer sheet is pressed in the laminating direction by, for example, hydrostatic pressing to prepare a multilayer block. Next, the multilayer block is cut into a predetermined size, and the multilayer chip is cut out.

Next, dielectric sheets for providing the first side margin portion W11 and the second side margin portion W12 are attached to the lateral surfaces of the multilayer chip. At this time, the corner portions and ridge portions of the multilayer chip are rounded by barrel polishing or the like.

Next, the multilayer chip is fired to prepare a multilayer body 10. The firing temperature is preferably, for example, about 900° C. or higher and about 1400° C. or lower. However, this depends on the material of the dielectric and the internal electrode layer.

Next, by dipping the first end surface C1 of the multilayer body 10 in an electrically conductive paste which is an electrode material for providing the base electrode layer by a dipping method, the electrically conductive paste for providing the first base electrode layer 415 is applied to the first end surface C1. Similarly, by dipping the second end surface C2 of the multilayer body 10 in the electrically conductive paste which is an electrode material for providing the base electrode layer, the electrically conductive paste for providing the second base electrode layer 425 is applied to the second end surface C2. Thereafter, these electrically conductive pastes are fired, such that the first base electrode layer 415 and the second base electrode layer 425 which are fired layers are formed. The firing temperature is preferably, for example, about 600° C. or higher and about 900° C. or lower.

As described above, the first base electrode layer 415 and the second base electrode layer 425, which are resin layers, may be formed by, for example, applying the electrically conductive paste containing conductive particles and a thermosetting resin by a coating method and firing, or alternatively, the first base electrode layer 415 and the second base electrode layer 425, which are thin films, may be formed by, for example, a thin film formation method such as a sputtering method or an evaporation method.

Furthermore, in the above description, the multilayer chip is fired, following which the base electrode layers are formed and fired, that is, the multilayer body and the external electrodes are fired separately. However, the base electrode layers may be formed and fired before firing the multilayer chip, that is, the multilayer body and the external electrodes may be fired simultaneously.

Thereafter, the first plated layer 416 is formed on the surface of the first base electrode layer 415 to form the first external electrode 41, and the second plated layer 426 is formed on the surface of the second base electrode layer 425 to form the second external electrode 42. Through the above steps, the above-described multilayer ceramic capacitor 1 is obtained.

As described above, with the multilayer ceramic capacitor 1 according to the present preferred embodiment, as shown in FIG. 3, in each of the first internal electrode layers 31, since the width W1 of the extension electrode portion 312 is smaller than the width W0 of the counter electrode portion 311, the distance from the first lateral surface B1 of the multilayer body 10 to the first internal electrode layer 31 is long at the first end surface C1 of the multilayer body 10. With such a configuration, it is possible to lengthen the intrusion path for moisture which intrudes between the first external electrode 41, and the first lateral surface B1 and the second lateral surface B2 of the multilayer body 10 to reach the first internal electrode layer 31 at the first end surface C1 of the multilayer body 10. Furthermore, as shown in FIG. 4, in the second internal electrode layer 32, since the width W1 of the extension electrode portion 322 is smaller than the width W0 of the counter electrode portion 321, the distance from the first lateral surface B1 and the second lateral surface B2 of the multilayer body 10 to the second internal electrode layer 32 is long at the second end surface C2 of the multilayer body 10. With such a configuration, it is possible to lengthen the intrusion path for moisture which intrudes between the second external electrode 42, and the first lateral surface B1 and the second lateral surface B2 of the multilayer body 10 to reach the second internal electrode layer 32 at the second end surface C2 of the multilayer body 10. Therefore, it is possible to improve the moisture resistance of the multilayer ceramic capacitor 1, and thus, it is possible to improve the reliability of the multilayer ceramic capacitor 1.

The internal electrode layer pattern is formed on the dielectric sheet by printing an electrically conductive paste on the dielectric sheet in a predetermined pattern, for example. As a method of forming the internal electrode layer pattern, screen printing, gravure printing, or the like can be used.

In the production of multilayer ceramic capacitors, a non-fired multilayer body is produced by providing non-fired side margin portions on lateral surfaces of a multilayer chip to be obtained by laminating and cutting a plurality of ceramic green sheets on which patterns of internal electrode layers are printed. However, when the patterns of internal electrode layers are printed, the edge portions of the patterns each tend to be thick, and when these portions are laminated and stacked, structural defects of the multilayer ceramic capacitor may occur.

For this reason, it is advantageous to provide the green sheets to be laminated in a shifted manner in the width direction W so that many of the edge portions of the patterns of the internal electrode layers do not overlap each other in the lamination direction T.

Figure 7:
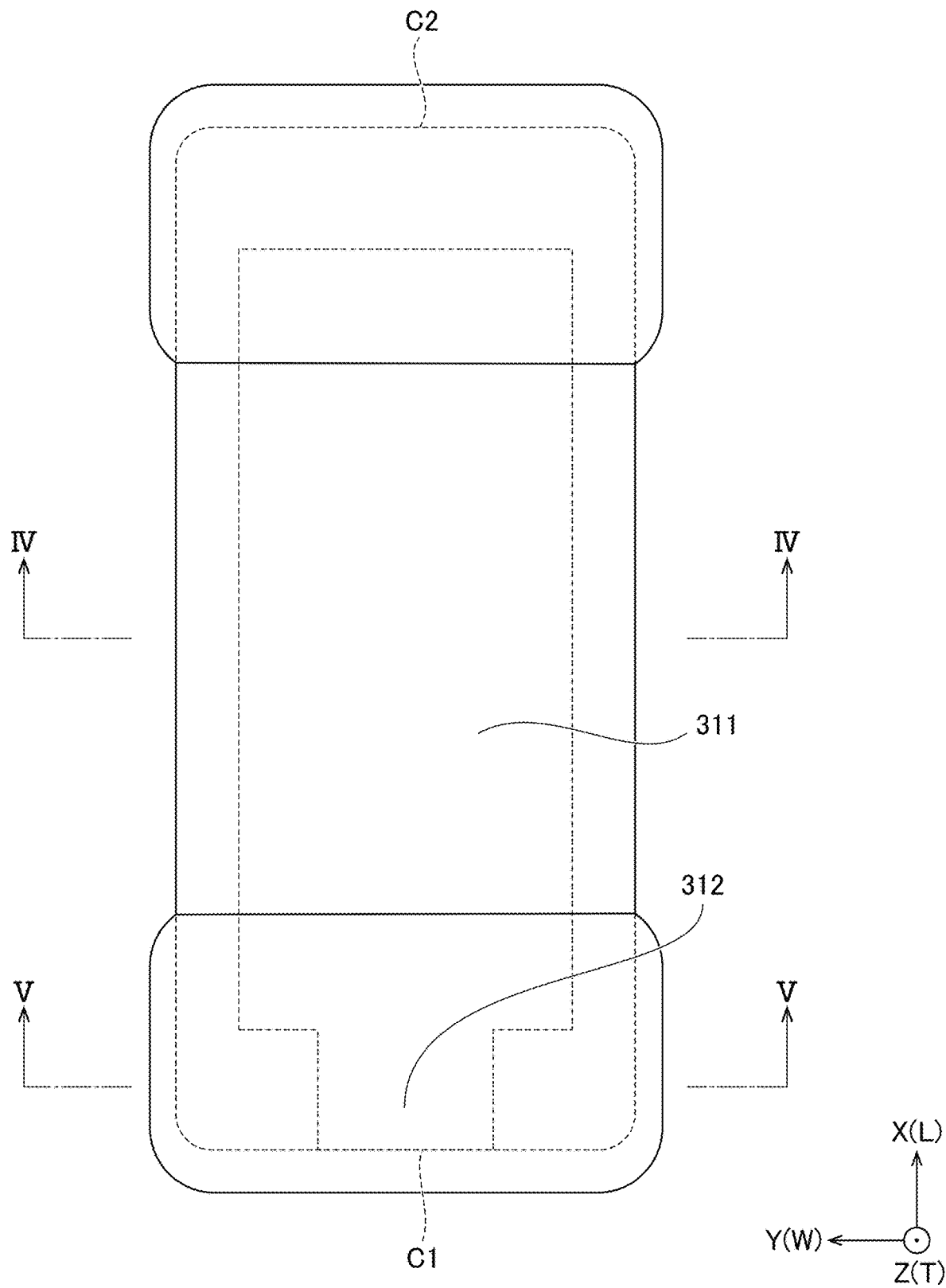
FIG. 7 is a partial plan perspective view of a multilayer ceramic capacitor according to a preferred embodiment of the present invention.
Figure 9:
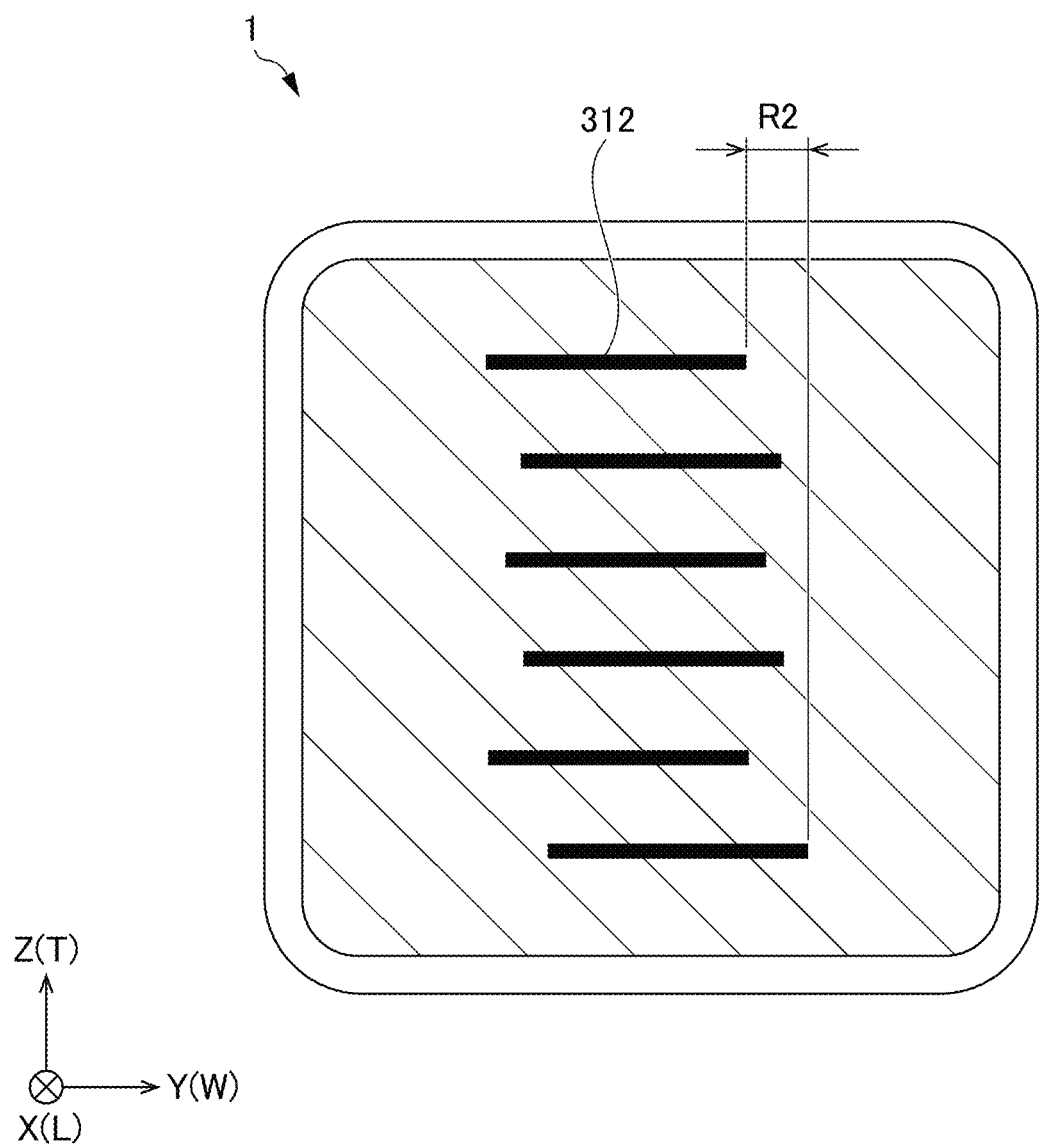
FIG. 9 is a cross-sectional view (WT cross-section) taken along the line V-V of the multilayer ceramic capacitor shown in FIG. 7, showing a preferred embodiment of the present invention.

When viewing the cross section (WT cross section) of the multilayer ceramic capacitor cut along the line V-V shown in FIG. 7, as shown in FIG. 9, one of the ends of the first extension electrode portions 312 in the width direction W is randomly shifted in the width direction W within the range of the maximum length R2 in order to avoid a large number thereof overlapping in the lamination direction T. By randomly shifting the positions in the width direction W within the range of the maximum length R2, it is possible to prevent structural defects caused by overlapping of the edge portions of the patterns. FIG. 9 shows the arrangement of one of the ends of the first extension electrode portions 312 in the width direction W. The same also applies to the arrangement of one of the ends of the second extension electrode portions 322 in the width direction W. FIG. 9 shows an example of the arrangement of one of the ends of the first extension electrode portions 312 in the width direction W, and the arrangement is not limited thereto.

On the other hand, in the manufacturing process of the multilayer ceramic capacitor, the non-fired side margin portions are provided on the lateral surfaces of the multilayer chip obtained by stacking and cutting the plurality of ceramic green sheets on which patterns of internal electrode layers are printed. However, the ends of the lateral surfaces of the internal electrode layers 30 of the multilayer body 10 in the width direction W are not necessarily aligned vertically. This is because errors occur in the cutting position and the cutting angle when cutting the multilayer block and cutting out the multilayer chip in the manufacturing process. Furthermore, when the ceramic green sheets are laminated, an error may occur at a position where the ceramic green sheets are laminated.

Figure 8:
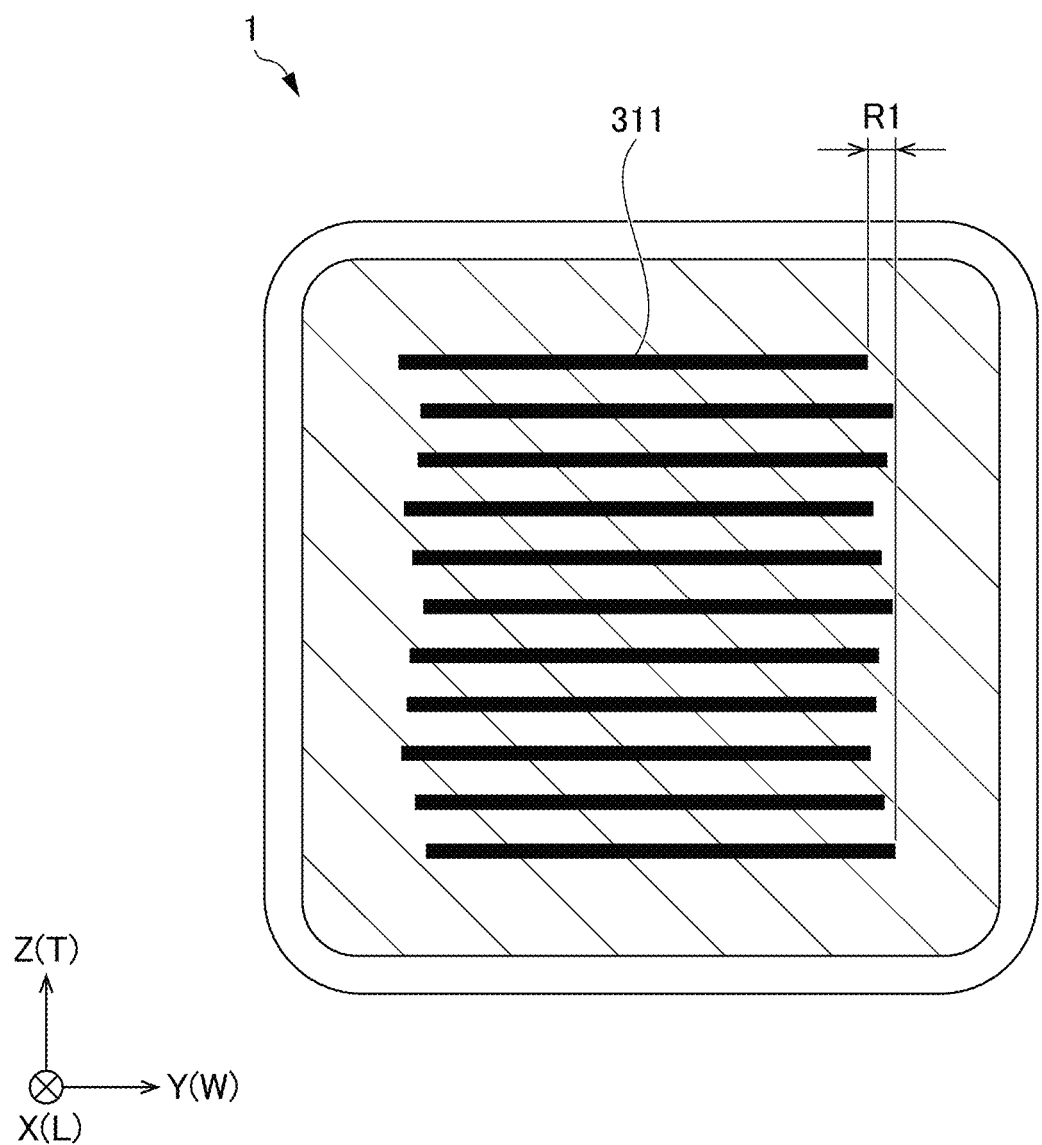
FIG. 8 is a cross-sectional view (WT cross-section) taken along the line IV-IV of the multilayer ceramic capacitor of FIG. 7, showing a preferred embodiment of the present invention.

Therefore, when viewing the cross section (WT cross section) of the multilayer ceramic capacitor cut along the line IV-IV shown in FIG. 7, as shown in FIG. 8, one end of each of the first counter electrode portion and the second counter electrode portion in the width direction W is not vertically aligned along the lamination direction T, but rather is randomly shifted in the width direction W within the range of the maximum length R1.

The range in which the green sheets to be laminated are provided so as to be shifted randomly in the width direction W is the maximum length R2 so that the edge portions of the patterns of the internal electrode layers do not overlap each other in the lamination direction T. By making this range larger than the maximum length R1 in the width direction W which may occur in the manufacturing process, it is possible to reliably prevent the edge portions of the patterns of the internal electrode layers from overlapping each other in the lamination direction T.

Therefore, when the maximum length in the width direction of the range in which one of the ends in the width direction of the counter electrode portions are provided is defined as R1, and the maximum length in the width direction of the range in which one of the ends in the width direction of the extension electrode portions are provided is defined as R2, in the multilayer ceramic capacitor in which the relationship between R1 and R2 is R2>R1, it is possible to securely improve the reliability.

Figure 10:
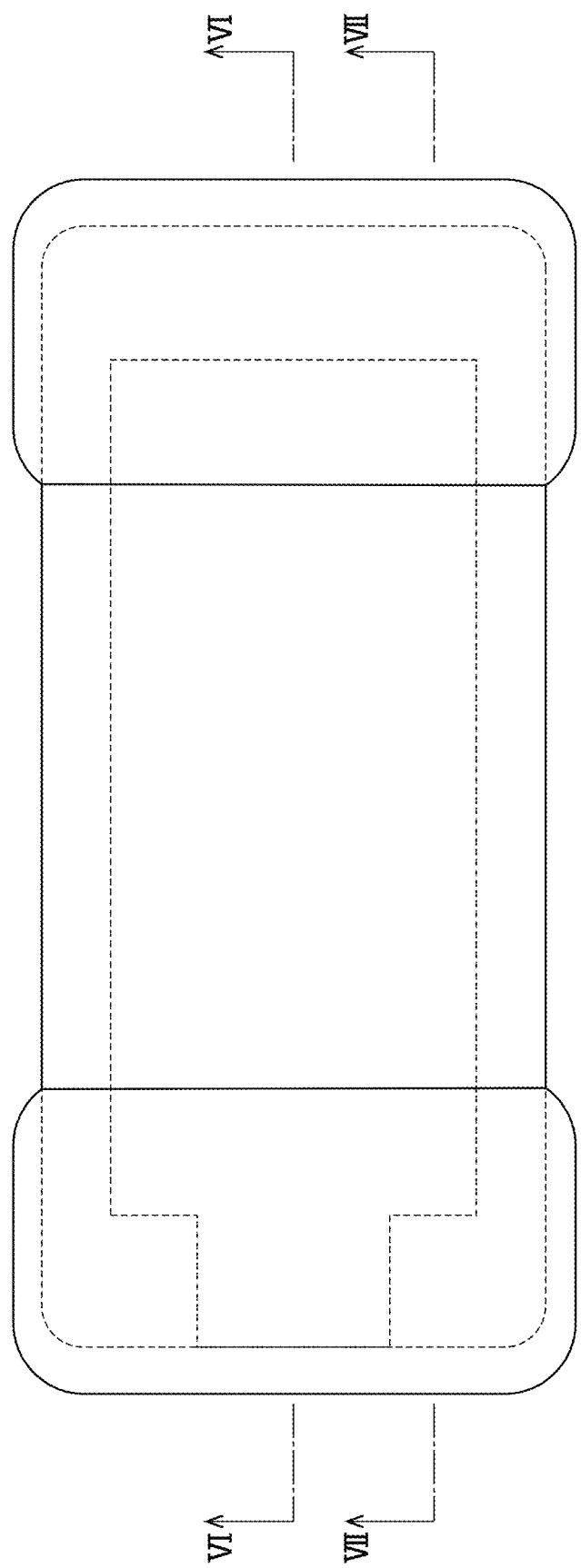
FIG. 10 is a partial plan perspective view of a multilayer ceramic capacitor according to a preferred embodiment of the present invention.
Figure 11:
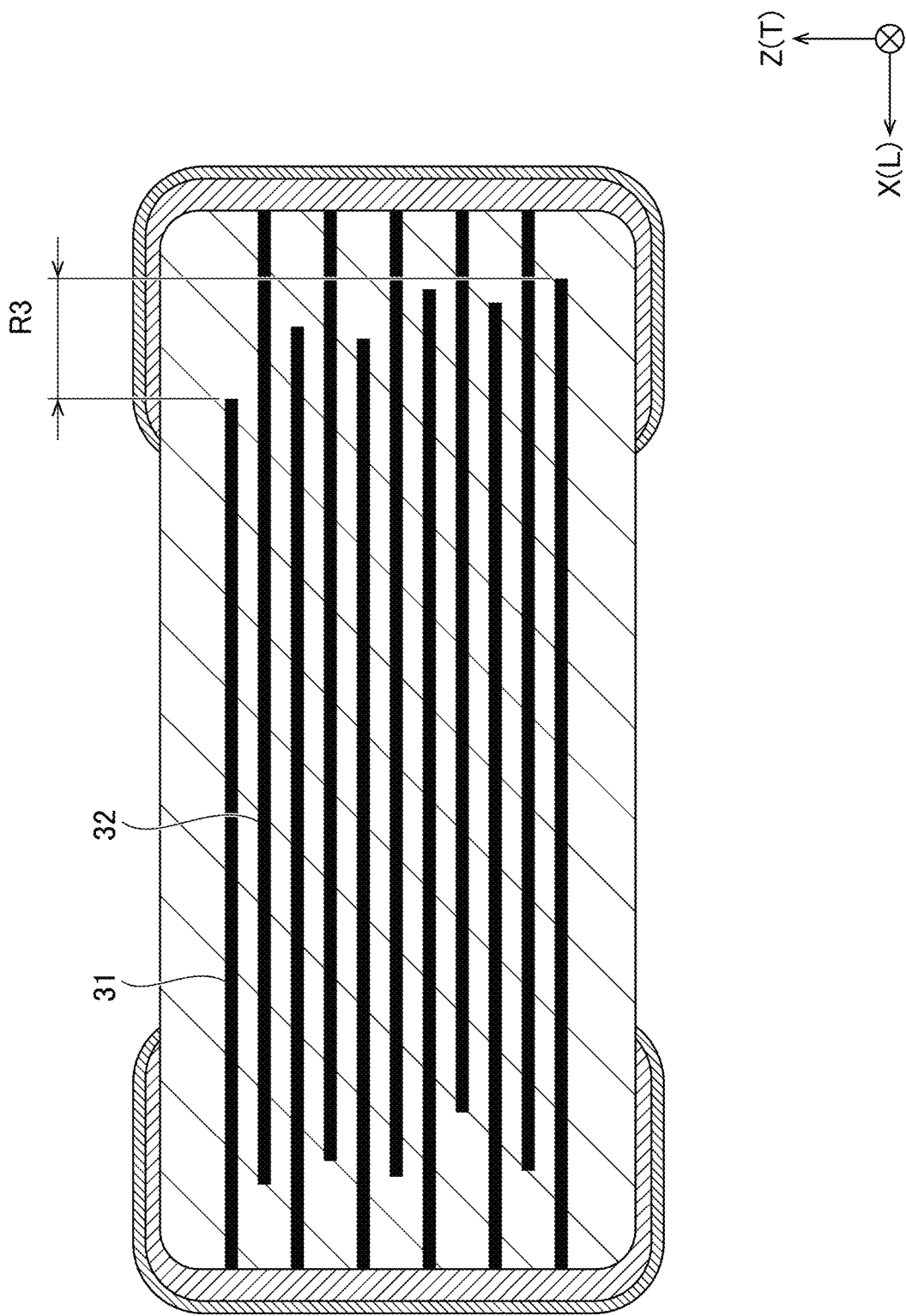
FIG. 11 is a cross-sectional view (LT cross-section) taken along the line VI-VI of the multilayer ceramic capacitor shown in FIG. 10, showing a preferred embodiment of the present invention.

Similarly, when viewing the cross section (LT cross section) of the multilayer ceramic capacitor cut along the line VI-VI shown in FIG. 10, it is important to randomly shift one of the ends of the first internal electrode layers 31 or the second internal electrode layers 32 in the length direction L within the range of the maximum length R3 in order to avoid vertical alignment along the lamination direction T, as shown in FIG. 11. FIG. 11 is an example illustrating the arrangement of one of the ends in the length direction L of the first internal electrode layers 31 or the second internal electrode layers 32, and the arrangement is not limited thereto.

By making the maximum length R3 larger than the maximum length R1 in the width direction W which may occur in the manufacturing process, it is possible to reliably prevent the edge portions of the patterns of the internal electrode layers from overlapping each other in the lamination direction T without being affected by the variation occurring in the manufacturing process.

Therefore, when the maximum length in the width direction of the range in which one of the ends in the width direction of the counter electrode portions are provided is defined as R1, and the maximum length in the length direction of the range in which one of the ends in the length direction of the counter electrode portions are provided is defined as R3, in the multilayer ceramic capacitor in which the relationship between R1 and R3 satisfies R3>R1, it is possible to securely improve the reliability.

Figure 12:
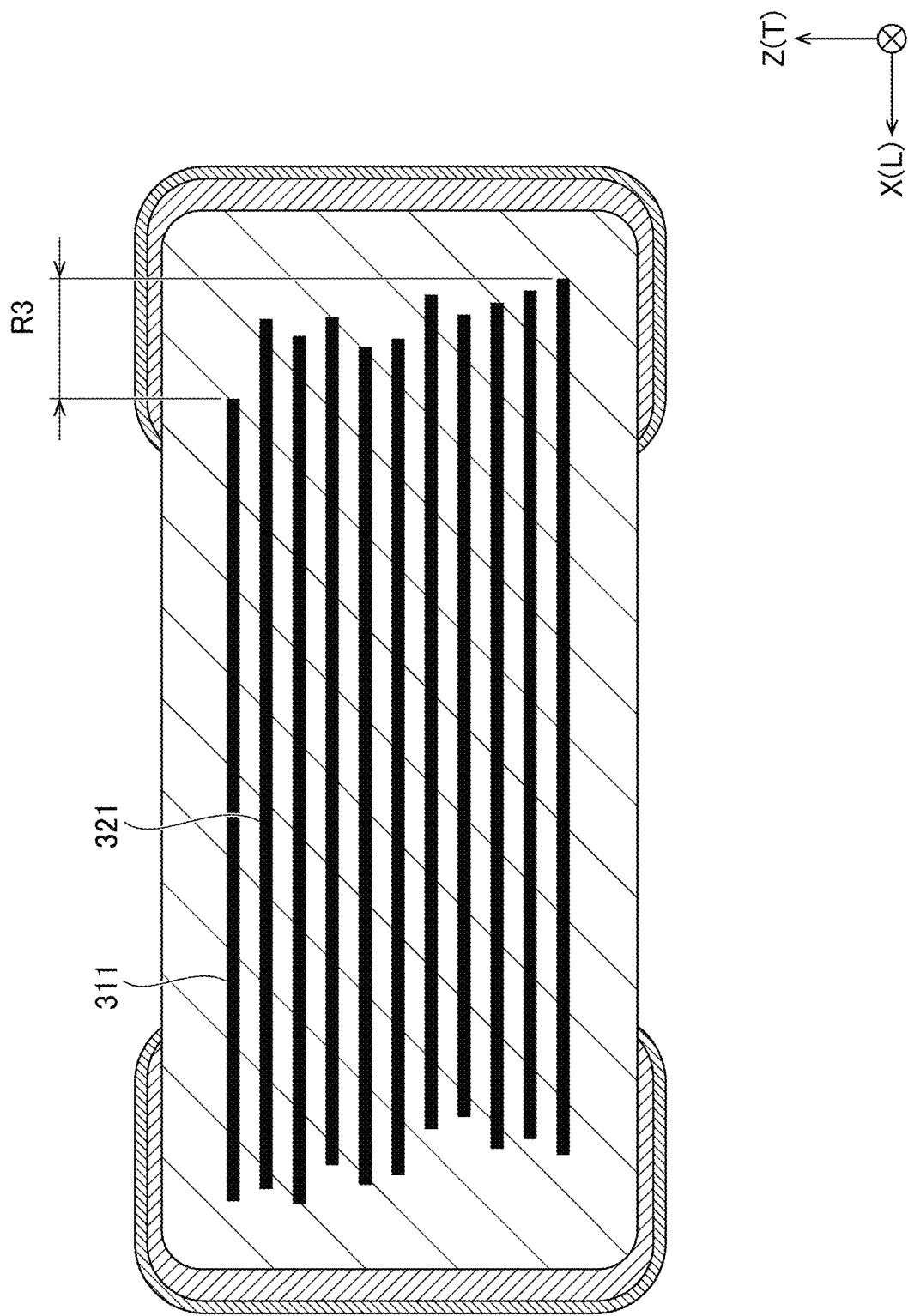
FIG. 12 is a cross-sectional view (LT cross-section) taken along the line VII-VII of the multilayer ceramic capacitor shown in FIG. 10, showing a preferred embodiment of the present invention.

Furthermore, when viewing the cross section (LT cross section) of the multilayer ceramic capacitor cut along the line VII-VII shown in FIG. 10, as shown in FIG. 12, both ends of the first counter electrode portions and the second counter electrode portions in the length direction L of the counter electrode portion appear. Here, the maximum length in the length direction of the range in which either one of the ends of the left and right side ends are provided may be defined as R3, and the relationship between R1 and R3 may be R3>R1.

Examples of observing the state in which the ends of the internal electrode layers are aligned include a method of observing, with a scanning electron microscope, a WT cross section or an LT cross section of a multilayer ceramic capacitor of a multilayer body exposed by polishing. Furthermore, the lengths of the ranges in which the one of the ends are provided R1, R2, and R3 can be measured by a scanning electron microscope.

Also in the multilayer ceramic capacitor that satisfies the above expression, one of the ends of the extension electrode portions in the width direction may overlap in the lamination direction. Therefore, since the thickness of the extension electrode portion in the lamination direction is smaller than that of the counter electrode portion, it is possible to reduce or prevent adverse effects caused by structural defects, and thus, it is possible to increase the reliability of the multilayer ceramic capacitor.

Sn can be segregated at the interface between the dielectric layer and the internal electrode layer by blending Sn into the electrically conductive paste of the internal electrode layer and firing together with the dielectric layer. By such segregation of Sn, it is possible to reduce or prevent the generation of structural defects more reliably.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
 a multilayer body including an inner layer portion including a plurality of dielectric layers and a plurality of internal electrode layers laminated therein, a pair of main surfaces opposed to each other in a lamination direction, a pair of end surfaces opposed to each other in a length direction orthogonal or substantially orthogonal to the lamination direction, and a pair of lateral surfaces opposed to each other in a width direction orthogonal or substantially orthogonal to the lamination direction and the length direction, the pair of lateral surfaces being provided by side margin portions on both sides of the inner layer portion; and a pair of external electrodes on the end surfaces of the multilayer body and opposed to each other; wherein the plurality of internal electrode layers each include, in the length direction, a counter electrode portion opposed to adjacent counter electrode portions of the plurality of internal electrode layers in the lamination direction, and an extension electrode portion extending from the counter electrode portion toward the end surface; and when viewing the multilayer body in a cross section parallel or substantially parallel to the width direction and the lamination direction, and when a maximum length in the width direction of a range in which one end in the width direction of the counter electrode portions is provided is defined as R1, and a maximum length in the width direction of a range in which one end in the width direction of the extension electrode portions is provided is defined as R2, a relationship between R1 and R2 is R2>R1.

2. The multilayer ceramic capacitor according to claim 1, wherein, when viewing the multilayer body in a cross section parallel or substantially parallel to the length direction and the multilayer direction, when a maximum length in the length direction of a range in which one end in the length direction of the counter electrode portions is provided is defined as R3, a relationship between R1 and R3 is R3>R1.

3. The multilayer ceramic capacitor according to claim 1, wherein each of the extension electrode portions is thinner than the counter electrode portions in the lamination direction.

4. The multilayer ceramic capacitor according to claim 1, wherein a thickness in the lamination direction of each of the dielectric layers is about 0.2 μm and about 0.6 μm or less.

5. The multilayer ceramic capacitor according to claim 1, wherein a thickness in the lamination direction of each of the dielectric layers is about 1.0 μm and about 15 μm or less.

6. The multilayer ceramic capacitor according to claim 1, wherein Sn is provided at an interface between the dielectric layers and the internal electrode layers.

7. The multilayer ceramic capacitor according to claim 1, wherein the multilayer body has a rectangular or substantially rectangular parallelepiped shape.

8. The multilayer ceramic capacitor according to claim 1, wherein corner portions and ridge portions of the multilayer body are rounded.

9. The multilayer ceramic capacitor according to claim 1, wherein each of the dielectric layers includes $BaTiO_3$, $CaTiO_3$, $SrTiO_3$, or $CaZrO_3$ as a main component.

10. The multilayer ceramic capacitor according to claim 9, wherein each of the dielectric layers includes at least one of Mg, Si, Mn, a rare earth element, Al, Ni, or V as a subcomponent.

11. The multilayer ceramic capacitor according to claim 10, wherein the rare earth element includes at least one of La, Ce, Pr, Nd, Sm, Eu, Gd, Tb, Dy, Ho, Er, Tm, Yb, Lu or Y.

12. The multilayer ceramic capacitor according to claim 1, wherein a thickness in the lamination direction of each of the dielectric layers is about 0.3 μm and about 0.45 μm or less.

13. The multilayer ceramic capacitor according to claim 1, wherein a number of the dielectric layers is 100 or more and 2000 or less.

14. The multilayer ceramic capacitor according to claim 1, wherein a thickness of each of the side margin portions is about 13 μm or more and about 25 μm or less.

15. The multilayer ceramic capacitor according to claim 1, wherein a thickness of each of the side margin portions is about 13 μm or more and about 18 μm or less.

16. The multilayer ceramic capacitor according to claim 1, wherein each of the internal electrode layers includes at least one of Cu, Ag, Pd, or Au or alloys including at least one of Cu, Ag, Pd, or Au as a main component.

17. The multilayer ceramic capacitor according to claim 1, wherein a thickness of each of the internal electrode layers is about 0.30 μm or more and about 0.40 μm or less.

18. The multilayer ceramic capacitor according to claim 1, wherein a thickness of each of the internal electrode layers is about 0.30 μm or more and about 0.35 μm or less.

19. The multilayer ceramic capacitor according to claim 1, wherein a number of the internal electrode layers is 10 or more and 1000 or less.

20. The multilayer ceramic capacitor according to claim 1, wherein dimensions of the multilayer body are about 0.6 mm or more and about 1.6 mm or less in the length direction, about 0.3 mm or more and about 0.8 mm or less in the width direction, and about 0.3 mm or more and about 0.8 mm or less in the lamination direction.

* * * * *